United States Patent
Polemi

(10) Patent No.: US 11,101,567 B2
(45) Date of Patent: Aug. 24, 2021

(54) MINIATURIZED PLANAR INVERTED FOLDED ANTENNA (PIFA) FOR MOUNTABLE UHF TAGS DESIGN

(71) Applicant: Checkpoint Systems, Inc., Thorofare, NJ (US)

(72) Inventor: Alessia Polemi, Philadelphia, PA (US)

(73) Assignee: Checkpoint Systems, Inc., Thorofare, NJ (US)

( * ) Notice: Subject to any disclaimer, the term of this patent is extended or adjusted under 35 U.S.C. 154(b) by 271 days.

(21) Appl. No.: 14/982,575

(22) Filed: Dec. 29, 2015

(65) Prior Publication Data

US 2017/0187118 A1 Jun. 29, 2017

(51) Int. Cl.
*H01Q 13/10* (2006.01)
*H01Q 1/52* (2006.01)
*G06K 19/077* (2006.01)

(52) U.S. Cl.
CPC ....... *H01Q 13/106* (2013.01); *G06K 19/0775* (2013.01); *G06K 19/0779* (2013.01); *H01Q 1/526* (2013.01)

(58) Field of Classification Search
CPC .. H01C 13/106; H01Q 1/526; G06K 19/0775; G06K 19/0779
See application file for complete search history.

(56) References Cited

U.S. PATENT DOCUMENTS

| | | | |
|---|---|---|---|
| 2005/0134461 A1* | 6/2005 | Gelbman | G06K 17/00 340/572.8 |
| 2007/0257801 A1* | 11/2007 | Nagae | B31D 1/027 340/572.7 |
| 2009/0045916 A1* | 2/2009 | Nitzan | G06K 19/0702 340/10.1 |
| 2009/0045963 A1* | 2/2009 | Vigneron | G06K 19/07758 340/572.8 |
| 2009/0324982 A1* | 12/2009 | Aramaki | H01F 41/16 428/548 |
| 2010/0252637 A1* | 10/2010 | Bouchard | G06K 19/07718 235/488 |
| 2011/0155814 A1* | 6/2011 | Kai | H01Q 1/2225 235/492 |
| 2012/0040128 A1* | 2/2012 | Finn | H01Q 7/00 428/96 |

(Continued)

OTHER PUBLICATIONS

Polemi ("Dual Band Slot-type Binocular Antenna for RFID Applications", Antennas and Propagation Society International Symposium, Jul. 2008, IEEE).*

(Continued)

*Primary Examiner* — Graham P Smith
*Assistant Examiner* — Jae K Kim
(74) *Attorney, Agent, or Firm* — McDonald Hopkins LLC

(57) ABSTRACT

A folded planar antenna device for radio frequency identification (RFID) reading is provided. The folded planar antenna device includes an RFID chip, a conductor member comprising a binocular-shaped slot; and a substrate. The conductor member is mounted on the substrate and the substrate is connected to the RFID chip through the binocular-shaped slot. The folded planar antenna device can be mounted on different objects, such as metal, meat, or liquid container, without being completely de-tuned.

14 Claims, 5 Drawing Sheets

(56) References Cited

U.S. PATENT DOCUMENTS

| | | | |
|---|---|---|---|
| 2012/0223868 A1* | 9/2012 | Tu | H01Q 3/24 343/769 |
| 2013/0002438 A1* | 1/2013 | Kansakoski | G09F 3/03 340/603 |
| 2013/0035050 A1* | 2/2013 | Gao | H01Q 1/243 455/193.1 |
| 2014/0284388 A1* | 9/2014 | Liu | H01Q 1/2225 235/492 |
| 2014/0354496 A1* | 12/2014 | Hwang | H01Q 1/243 343/770 |
| 2015/0310327 A1* | 10/2015 | Karmakar | H01Q 21/064 340/10.1 |
| 2015/0317896 A1* | 11/2015 | Planton | G06K 19/0717 340/584 |
| 2016/0178553 A1* | 6/2016 | Bommarito | G01N 27/225 73/335.04 |

OTHER PUBLICATIONS

Manzari ("Miniaturized wearable UHF-RFID tag with tuning capability", Electronic Letters, vol. 48, Issue 21, Oct. 2012).*

A. Polemi, A. Toccafondi, "Dual band slot-type binocular antenna for RFID applications," in Antennas and Propagation Society International Symposium, 2008. AP-S 2008. IEEE , vol., No., pp. 1-4, Jul. 5-11, 2008, all enclosed pages cited.

S. Manzari, S. Pettinari, G. Marrocco, "Miniaturized wearable UHF-RFID tag with tuning capability," in Electronic Letters, vol. 48, n. 21, Oct. 2012, all enclosed pages cited.

* cited by examiner

MINIATURIZED PLANAR INVERTED FOLDED ANTENNA (PIFA) FOR MOUNTABLE UHF TAGS DESIGN

TECHNICAL FIELD

Various example embodiments of the present application relate generally to antenna devices for radio frequency identification (RFID) tags, and more particularly relate to a planar inverted folded antenna device for RFID tags that can be mounted on various objects without being completely de-tuned.

BACKGROUND

Security devices have continued to evolve over time to improve their functional capabilities and reduce the cost of such devices. Some security devices are provided to be attached to individual products or objects in order to deter or prevent theft of such products or objects. In some cases, the security devices may include tags or other such components that can be detected, for example by gate devices at the exit of a retail establishment or tracked while being moved in the retail establishment. Radio frequency identification (RFID) is a technology for the security devices that incorporates the use of electromagnetic or electrostatic coupling in the radio frequency (RF) portion of the electromagnetic spectrum. RFID tags may sometimes be read for inventory management purposes and may include, or otherwise be associated with, specific information about the type of product to which they are attached. An RFID tag generally includes a chip and aluminum, copper or silver antenna bonded to a polyethylene terephthalate (PET) layer.

In order to improve the ability of retailers to deter theft or manage inventory, the security devices, and the systems in which they operate, are continuously being improved. For example, various improvements to the RFID tag have been introduced in an attempt to improve the ability of the security tag to work with products which may have a material loading effect on an antenna design associated with the security tag.

In this regard, placing an RFID tag directly on a package of a product with varying dielectric values, for example meat, which may contain varying amounts of water, has been problematic for the security industry. Conventionally, when an RFID tag is placed on a product with varying dielectric values, not only are the RFID tag resonant characteristics affected (e.g., the resonant frequency and the associated Q factor), but the radiation performance of the RFID tag may also be affected. As a result, the RFID system typically fails to reliably detect the presence of the RFID tag from many angles when placed on a product packaged with varying dielectric values due in part to material loading on the RFID tag.

In some cases, standard ultra high frequency (UHF) dipole-like inlay tags have been used as RFID tags. However, the standard UHF dipole-like tags have disadvantages relative to maintaining performance when they are mounted on special objects, such as metal, meat, or liquids. A product packaged with metallic material, or a meat product, may detune the standard UHF dipole-like tags to the point that it becomes undetectable by an RFID reader, even from a short distance. These standard UHF dipole-like inlay tags are not sufficient to overcome these limitations.

Accordingly, a low profile, low cost antenna design for use with an RFID tag that provides good radio frequency (RF) performance, even when mounted on various objects, such as metallic objects, meat products, or liquid containers, is needed.

BRIEF SUMMARY OF SOME EXAMPLES

In an example embodiment, a folded planar antenna device is provided for radio frequency identification (RFID) reading. The folded planar antenna device includes an RFID chip, a conductor member comprising a binocular-shaped slot; and a substrate. The conductor member is folded around the substrate In another example embodiment for the folded planar antenna device, the RFID chip is disposed at the middle of the binocular-shaped slot.

In another example embodiment for the folded planar antenna device, the substrate comprises a polyethylene terephthalate (PET) layer, an outer paper layer and an inner paper layer. However, other materials could also be used for the substrate.

In another example embodiment for the folded planar antenna device, the PET layer and the outer paper layer are folded and the inner paper is disposed between two sides of the folded PET layer and the folded outer paper layer.

In another example embodiment for the folded planar antenna device, the PET layer, the outer paper layer and the inner paper layer are attached to each other using adhesive.

In another example embodiment for the folded planar antenna device, the conductor member further comprises a plurality of dents disposed at left edge and right edge of the conductor member.

In another example embodiment for the folded planar antenna device, the length of each of the plurality of dents determines the amount of antenna resonance.

In another example embodiment for the folded planar antenna device, the thickness of the substrate is less than about 0.8 millimeters.

In another example embodiment for the folded planar antenna device, the conductor member is made with aluminum.

In another example embodiment for the folded planar antenna device, the binocular-shaped slot provides required inductive reactance to balance microstrip impedance which is highly capacitive.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
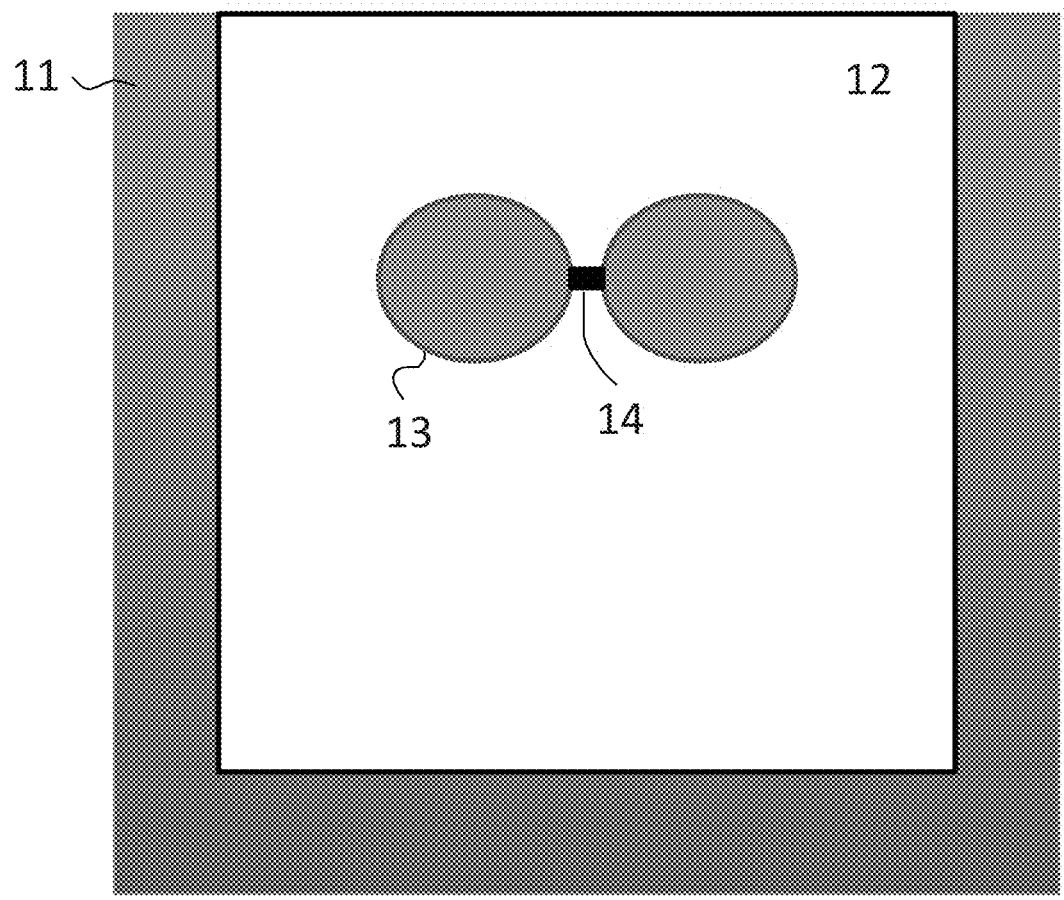
FIG. 1 illustrates a visual representation of a folded planar antenna device according to an example embodiment.

Some example embodiments now will be described more fully hereinafter with reference to the accompanying drawings, in which some, but not all embodiments are shown. Indeed, the examples described and pictured herein should not be construed as being limiting as to the scope, applicability or configuration of the present disclosure. Like reference numerals refer to like elements throughout. Furthermore, as used herein, the term "or" is to be interpreted as a logical operator that results in true whenever one or more of its operands are true. As used herein, "operable coupling" should be understood to relate to direct or indirect connection that, in either case, enables at least a functional interconnection of components that are operably coupled to each other.

Example embodiments will be described herein as it relates to a folded planar antenna device, and a folded planar antenna device for use with an RFID tag. The folded planar antenna device, and the folded planar antenna device for use with an RFID tag, is provided for placement on a product having a variable dielectric value. A security tag device, for example, may comprise the folded planar antenna device, and may be provided on a product or among other devices to be used for detecting the security tag device within a monitoring environment.

FIG. 1 illustrates a conceptual diagram of a folded planar antenna device 10 for use in accordance with an example embodiment. The folded planar antenna device 10 may be placed on a product having a variable dielectric value such as, for example, metal, meat, or liquid.

The folded planar antenna device 10 may include a conductor member 12 and a substrate 11. The conductor member 12 may be made out of a conductive metal such as, for example, copper, aluminum, nickel, gold, silver, etc., or a combination thereof. The conductor member 12 may be made relatively thin so that the folded planar antenna device 10 has some degree of flexibility when fully assembled.

The conductor member 12 may comprise a slot that is referred to herein as a binocular-shaped slot 13. The binocular-shaped slot 13 may be made in the conductor member 12 by cutting a portion of the conductor member 12 away to form the binocular-shaped slot 13. Alternatively, the binocular-shaped slot 13 may be made in the conductor member 12 by chemically etching material away such that the removed material forms the binocular-shaped slot 13 in the conductor member 12. FIG. 1 illustrates an example position of the binocular-shaped slot 13 in the conductor member 12, where the binocular-shaped slot 13 is at the center of the conductor member 12. However, the binocular-shaped slot 13 may be located anywhere inside of the conductor member 12.

Of note, the term "binocular-shaped" is used herein to describe the shape of the slot, because the shape of the slot resembles the familiar shape of binoculars. In this regard, the term "binocular-shaped" refers to the shape resulting from the provision of two oval or round structures or shapes in relative close proximity to each other. In this case, the absence of material in the form of two oval or round slots positioned relatively close to each other defines the binocular-shaped slot 13. According to some example embodiments, a binocular-shaped slot may take the form of two non-uniform ovals that are each narrower at one end and broader at the other (e.g., egg shaped).

An RFID chip 14 may be connected to the substrate 11 through a middle or center portion of the binocular-shaped slot 13. In some cases, the two oval or round slots that form the binocular-shaped slot 13 may be spaced apart from each other by a relatively small distance defining a gap. The RFID chip 14 may be provided in the gap and may, in some cases, fill the gap. The RFID chip 14 may comprise a radio frequency circuit. The RFID chip 14 may be attached to the center of the binocular-shaped slot 13 by manual means such as, for example, by one or more wire bonds and/or by an electrically conductive epoxy.

The form factor of the binocular-shaped slot 13 may provide inductive reactance sufficient to balance the otherwise relatively highly capacitive impedance of the microstrip. The rounded shape of the respective portions that form the slot provides a wider bandwidth to the tuning mechanism if compared with a regular H-shaped rectangular slot.

The substrate 11 may be configured to achieve high de-coupling from an object to which the folded planar antenna device 10 is attached when the object is below the folded planar antenna device 10. The substrate 11 may be connected to the RFID chip through the binocular-shaped slot 13.

The folded planar antenna device 10 may be removed at the point of sale, or may be deactivated using a deactivator. In the case of a deactivator, the deactivator is configured to submit the RFID chip 14 that is to be deactivated to a strong electromagnetic field that can break down, for example, the capacitor of the LC tank circuit. The deactivator may, in some cases, be a deactivation pad over which the folded planar antenna device 10 is passed for deactivation.

The RFID chip 14 may include a resonant circuit that utilizes at least one coil, for example a planar spiral inductor, and at least one capacitor, for example a plate capacitor, that operates to resonate when exposed to a predetermined electromagnetic field such as, for example, RF energy in a frequency band centered at 86.6 MHz. By way of example only, the coil and the capacitor may be etched on a planar dielectric substrate whereby a multi-turn conductive trace, thereby forming the coil, terminates in a conductive trace pad which forms one plate of the capacitor.

Figure 2:
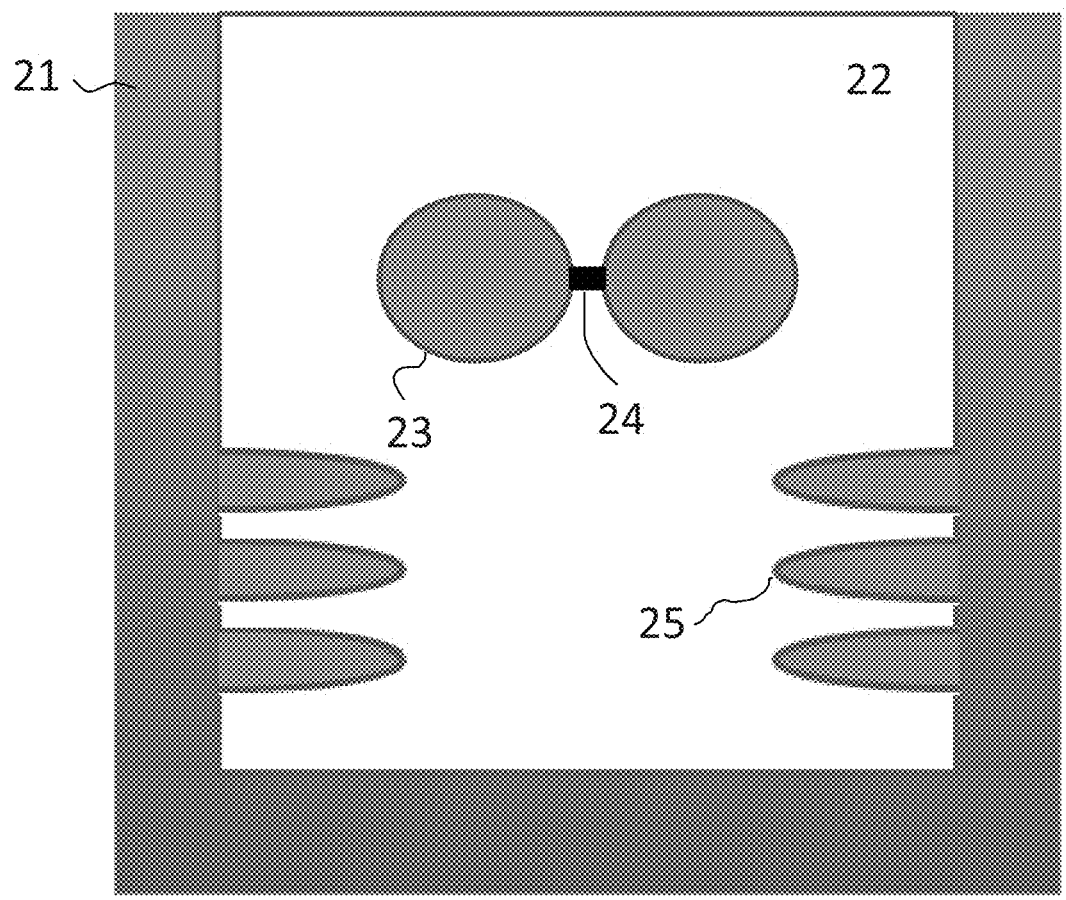
FIG. 2 illustrates a visual representation of a folded planar antenna device according to another example embodiment.

FIG. 2 illustrates a visual representation of a folded planar antenna device 20 according to another example embodiment. The folded planar antenna device 20 may be placed on a product having a variable dielectric value such as, for example, metal, meat, or liquid.

The folded planar antenna device 20 may include a conductor member 22 and a substrate 21. The conductor member 22 may be made out of a conductive metal such as, for example, copper, aluminum, nickel, gold, silver, etc., or a combination thereof. The conductor member 22 may be made relatively thin so that the folded planar antenna device 20 has some degree of flexibility when fully assembled.

The conductor member 22 may include a binocular-shaped slot 23 and an RFID chip 24, as described in FIG. 1. Thus, for example, the binocular-shaped slot 23 may be placed at any desirable portion of the conductor member 22 and need not necessarily be placed at the center of the conductor member 22. The conductor member 22 may further comprise a plurality of dents 25 or "comb dents" as provided in FIG. 2. The dents 25 may be disposed such that they are split between a left edge and a right edge of the conductor member 22. Thus, for example, half of the dents 25 may be provided along a portion of the left edge of the conductor member 22, and the other half of the dents 25 may be provided along a portion of the right edge of the conductor member 25. The dents 25 may be adjacent to one another, but may be spaced apart from each other by a distance that is smaller than the length or width of the dents 25. According to some example embodiments, the dents 25 may have a shape of a semi-circle or a semi-oval. Further, according to some example embodiments, each dent 25 may extend towards an interior of the conductor member 22 beyond the outermost extent of the binocular-shaped slot 23.

The dents 25 may be made in the conductor member 22 by cutting a portion of the conductor member 22 away to form the plurality of dents 25. Alternatively, the dents 25 may be made in the conductor member 22 by chemically etching some material of the conductor member 22 away to form the dents 25.

The presence of the dents 25 allows extending the current path from the microchip terminals towards the radiating edge. As a consequence, the electrical length of the antenna increases and hence the antenna's resonance shifts towards a lower frequency producing miniaturization. The length of the dents 25 can be modified to tune the folded planar antenna device 20 to a particular frequency of antenna resonance.

In an exemplary embodiment, the conductor member is made using aluminum and the substrate is made using PET. This technology offers many degrees of flexibility from the manufacturing point of view. In an example embodiment, the folded planar antenna device may be made from an unfolded antenna printed on PET of substantial thickness. Printer capabilities may limit the thickness of PET that is achievable. Thus, in some cases, the PET should be printed as thick as the printer can handle, and is then folded after the area forming the slot is cut. In another exemplary embodiment, the folded planar antenna device may be made from an unfolded antenna printed on thin PET, then folded and wrapped around a dielectric layer of choice (PET, high density dielectric content layer, or the like). This provides future flexibility for further miniaturization.

Figure 3A:
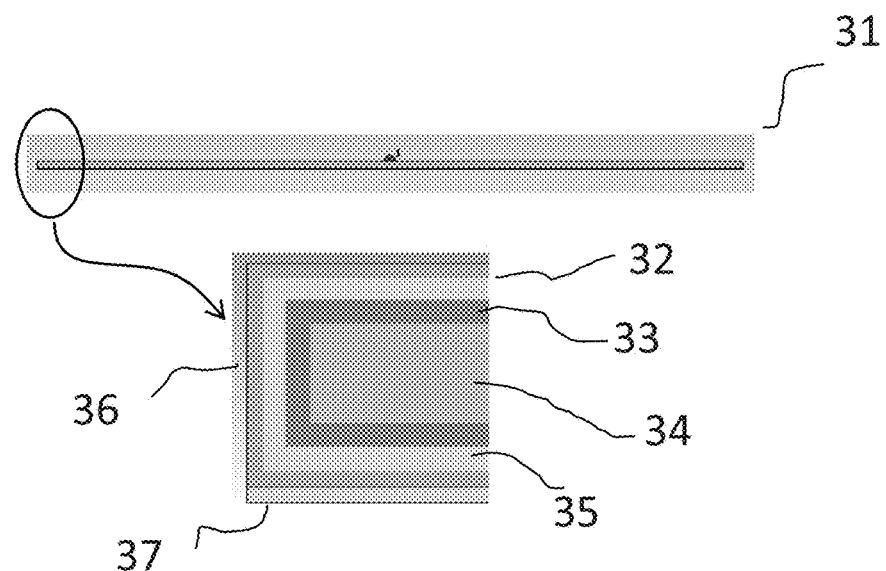
FIGS. 3A and 3B illustrate visual representations of a substrate of a folded planar antenna device according to an example embodiment.
Figure 3B:
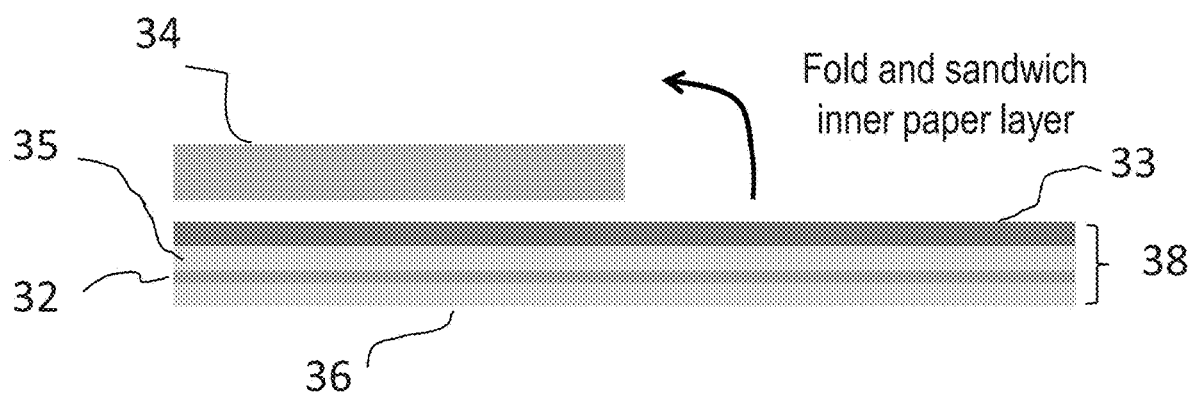

FIGS. 3A and 3B illustrate a visual representation of a substrate of a folded planar antenna device according to an example embodiment. In particular, FIGS. 3A and 3B represent a side view of the folded planar antenna device. Referring to FIG. 3A, the substrate 31 corresponds to the substrates 11 and 21 in FIGS. 1 and 2.

The substrate 31 comprises a PET layer 36, an outer paper layer 35 and an inner paper layer 34. The PET layer 36, the outer paper layer 35 and the inner paper layer 34 are attached to each other using adhesive material 32 and 33.

The PET layer 36 may be similar with the PET layer in other RFID tags to which the metallic conductor part is bonded. The outer paper layer 35 and the inner paper layer 34 may be made using the same type of paper or using different types of papers. In an example embodiment, the inner paper layer 34 may be made using a thick paper, such as card stock or manila folder paper.

Referring to FIG. 3B, the outer part 38 that comprises the PET layer 36, the outer paper layer 35, and the adhesive material 32 and 33 is folded over the inner paper layer 34 to form the substrate 31. Accordingly, the inner paper layer 34 is disposed between two sides of the folded PET layer 36 and the folded outer paper layer 35. That is, the substrate 31 has two layers of the PET layer 36, the outer paper layer 35, and the adhesive material 32 and 33 and one layer of inner paper layer 34.

In an example embodiment, the target thickness of the folded planar antenna device may be about 0.51 mm. In some example embodiments, the target thickness may be achieved by using 0.03 mm for the conductor member, 0.01 mm for the PET layer 36, 0.04 mm for the outer paper layer 35, 0.02 mm and 0.04 mm for the adhesive material 32 and 33, and 0.25 mm for the inner paper layer 34.

The folded planar antenna devices 10 and 20 may provide improvement in performance relative to traditional designs, and may do so in a smaller form factor. FIGS. 4-7 illustrate performance results with a folded planar antenna device according to an example embodiment. The performance results correspond to a substrate having a thickness of about 0.8 mm. The folded planar antenna device in these examples is mounted on various different objects, such as meat ($\varepsilon_r$=55, tg $\delta$=0.4), metal-copper ($\sigma$=5.8 e-7 S/m), and water ($\varepsilon_r$=78, $\delta$=1.59 S/m).

Figure 4:
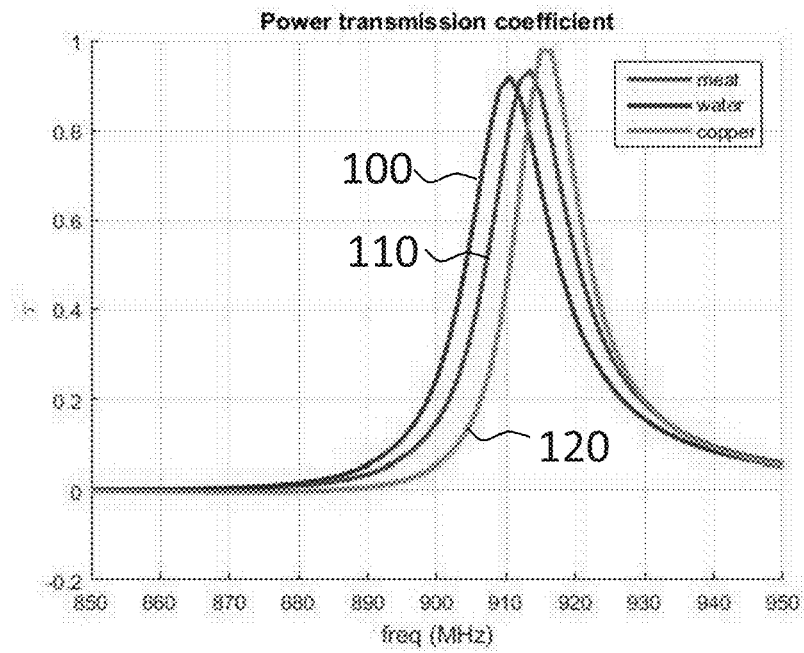
FIG. 4 illustrates example performance result for power transmission coefficient of the folded planar antenna device when placed proximate to different objects according to an example embodiment.

FIG. 4 illustrates example performance results for power transmission coefficient of the folded planar antenna device when placed proximate to each respective one of the objects mentioned above. Curve 100 corresponds to power transmission coefficient versus frequency for placement of the folded planar antenna device proximate to water, curve 110 corresponds to power transmission coefficient versus frequency for placement of the folded planar antenna device on meat, and curve 120 corresponds to power transmission coefficient versus frequency for placement of the folded planar antenna device proximate to copper.

Figure 5:
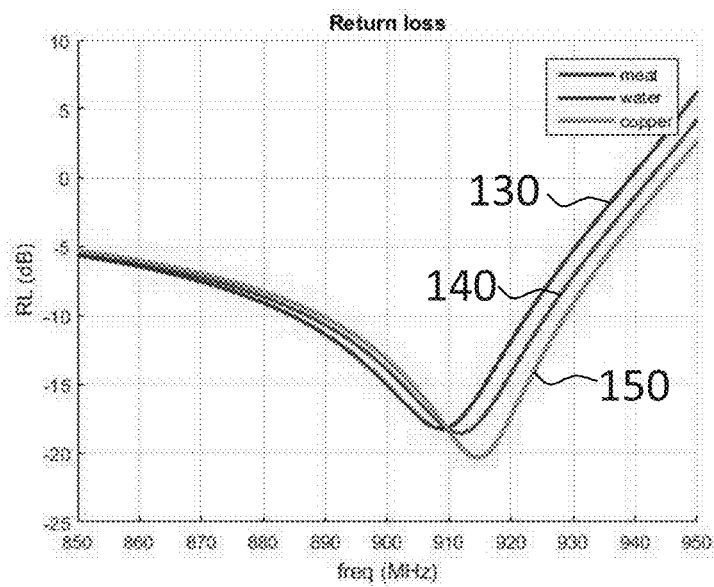
FIG. 5 illustrates example performance results for return loss of the folded planar antenna device when placed proximate to different objects according to an example embodiment.

FIG. 5 illustrates example performance results for return loss of the folded planar antenna device when placed proximate to each respective one of the objects mentioned above. Curve 130 corresponds to return loss versus frequency for placement of the folded planar antenna device proximate to water, curve 140 corresponds to return loss versus frequency for placement of the folded planar antenna device on meat, and curve 150 corresponds to return loss versus frequency for placement of the folded planar antenna device proximate to copper.

Figure 6:
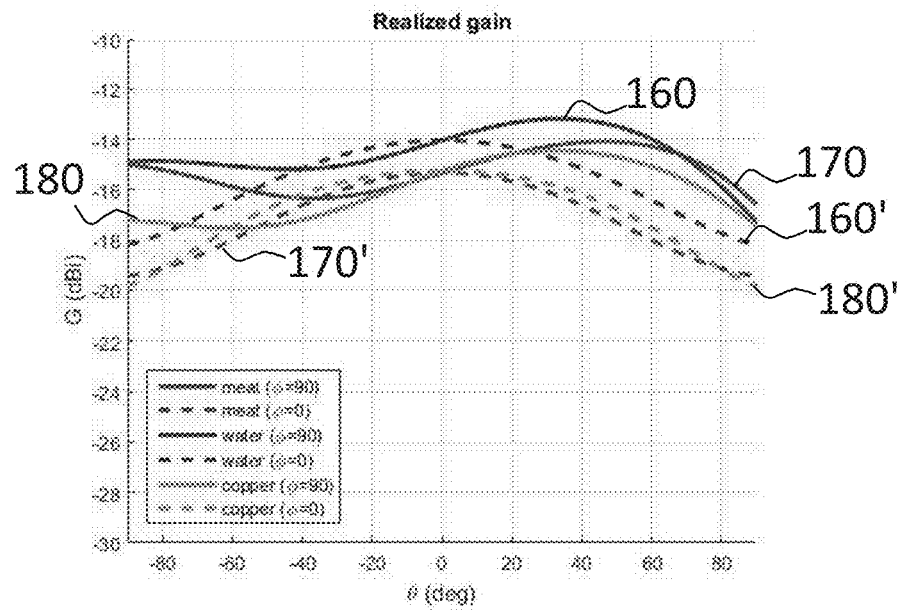
FIG. 6 illustrates example performance results for realized gain of the folded planar antenna device when placed proximate to different objects according to an example embodiment.

FIG. 6 illustrates example performance results for realized gain of the folded planar antenna device when placed proximate to each respective one of the objects mentioned above for two different values of $\phi$. Curve 160 corresponds to realized gain versus phase $\theta$ for placement of the folded planar antenna device proximate to water with $\phi$=90 and curve 160' corresponds to realized gain versus phase $\theta$ for placement of the folded planar antenna device proximate to water with $\phi$=0. Curve 170 corresponds to realized gain versus phase $\theta$ for placement of the folded planar antenna device proximate to meat with $\phi$=90 and curve 170' corresponds to realized gain versus phase $\theta$ for placement of the folded planar antenna device proximate to meat with $\phi$=0. Curve 180 corresponds to realized gain versus phase $\theta$ for placement of the folded planar antenna device proximate to copper with $\phi$=90 and curve 180' corresponds to realized gain versus phase $\theta$ for placement of the folded planar antenna device proximate to copper with $\phi$=0.

Figure 7:
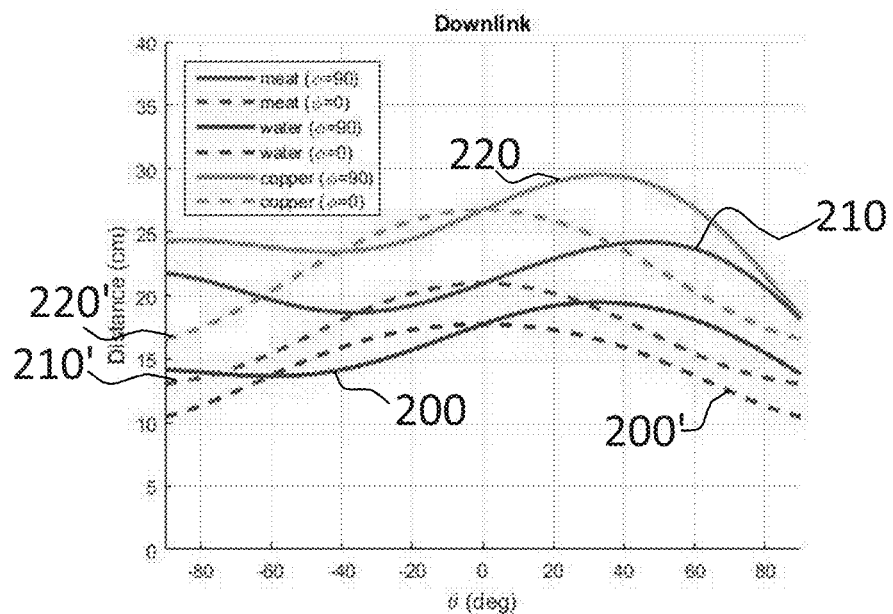
FIG. 7 illustrates example performance results for activation distance for downlink budget of the folded planar antenna device when placed proximate to different objects according to an example embodiment.

FIG. 7 illustrates example performance results for activation distance for downlink budget of the folded planar antenna device when placed proximate to each respective one of the objects mentioned above. The result is from using 14 dBm transmitted power, 5 dBi reader antenna gain, and 0.5 polarization mismatch. Curve 200 corresponds to activation distance versus phase $\theta$ for placement of the folded planar antenna device proximate to water with $\phi$=90 and curve 200' corresponds to activation distance versus phase θ for placement of the folded planar antenna device proximate to water with φ=0. Curve 210 corresponds to activation distance versus phase θ for placement of the folded planar antenna device proximate to meat with φ=90 and curve 210' corresponds to activation distance versus phase θ for placement of the folded planar antenna device proximate to meat with φ=0. Curve 220 corresponds to activation distance versus phase θ for placement of the folded planar antenna device proximate to copper with φ=90 and curve 220' corresponds to activation distance versus phase θ for placement of the folded planar antenna device proximate to copper with φ=0.

Accordingly, the folded planar antenna device in various example embodiments shows improved performances of average power transmission coefficient of 0.9, average return loss of −17 dB, average realized gain of −16 dB, and average reading distance (downlink) of 20 cm for 14 dBm transmitted power.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A folded planar antenna device for radio frequency identification (RFID) reading, comprising:
    an RFID chip;
    a conductor member comprising a first oval or round slot and a second oval or round slot; and
    a substrate having a polyethylene terephthalate (PET) layer, a first paper layer and a second paper layer, wherein the substrate is folded forming a folded substrate;
    wherein, the conductor member is mounted on the folded substrate and the folded substrate is connected to the RFID chip through the first oval or round slot and the second oval or round slot, wherein the conductor member further comprises a plurality of cut-away portions disposed at edges of the conductor member.

2. The folded planar antenna device of claim 1, wherein the RFID chip is disposed at a middle portion of the first oval or round slot and second oval or round slot.

3. The folded planar antenna device of claim 1, wherein the PET layer and the first paper layer are folded and the second paper is disposed between two sides of the folded PET layer and the folded first paper layer.

4. The folded planar antenna device of claim 1, wherein a length of each of the plurality of cut-away portions determines an amount of antenna resonance.

5. The folded planar antenna device of claim 1, wherein half of the plurality of cut-away portions are disposed at a first edge of the conductor member and remaining ones of the plurality of cut-away portions are disposed at a second edge of the conductor member, the first and second edges being opposite edges.

6. The folded planar antenna device of claim 1, wherein a thickness of the folded substrate is less than about 0.8 millimeters.

7. The folded planar antenna device of claim 1, wherein the conductor member is made with copper, aluminum, nickel, gold, or silver.

8. The folded planar antenna device of claim 1, wherein the first oval or round slot and second oval or round slot provides an amount of inductive reactance to balance a capacitive reactance component of microchip impedance.

9. The folded planar antenna device of claim 1, wherein the first and second oval or round slots are spaced apart from each other by a distance defining a gap.

10. The folded planar antenna device of claim 1, wherein the first oval or round slot and second oval or round slot are formed by chemical etching of the conductor member.

11. The folded planar antenna device of claim 1, wherein the first oval or round slot and second oval or round slot are formed by cutting material away from the conductor member.

12. The folded planar antenna device of claim 3, wherein the PET layer, the first paper layer and the second paper layer are attached to each other using adhesive.

13. The folded planar antenna device of claim 5, wherein adjacent ones of the plurality of cut-away portions are spaced apart from each other by a distance that is less than a length or width of each of the plurality of cut-away portions.

14. The folded planar antenna device of claim 9, wherein the RFID chip is disposed in the gap.

* * * * *